(12) United States Patent
Kirkham et al.

(10) Patent No.: US 8,291,031 B1
(45) Date of Patent: Oct. 16, 2012

(54) SENDER CONTROL OF EXPIRY OF AN ELECTRONIC MESSAGE

(75) Inventors: Stephen Kirkham, San Francisco, CA (US); Brandon Bilinski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/306,925

(22) Filed: Nov. 29, 2011

(51) Int. Cl.
*G06F 15/16* (2006.01)
(52) U.S. Cl. ......... 709/206; 709/203; 709/204; 709/207
(58) Field of Classification Search .................. 709/206, 709/203, 204
See application file for complete search history.

(56) References Cited

U.S. PATENT DOCUMENTS

| | | |
|---|---|---|
| 6,978,284 B2 | 12/2005 | McBrearty et al. |
| 2005/0267937 A1* | 12/2005 | Daniels et al. ............... 709/206 |
| 2006/0075039 A1* | 4/2006 | Narayanaswami et al. ... 709/206 |
| 2008/0034003 A1 | 2/2008 | Stakutis et al. |
| 2008/0313296 A1* | 12/2008 | Muller .......................... 709/206 |
| 2009/0248823 A1* | 10/2009 | Li et al. ......................... 709/206 |
| 2009/0265552 A1* | 10/2009 | Moshir et al. ................. 713/168 |

* cited by examiner

*Primary Examiner* — Djenane Bayard
(74) *Attorney, Agent, or Firm* — McDermott Will & Emery LLP (57) ABSTRACT

A system and machine-implemented method for deleting an electronic correspondence stored on a server is provided. A command for sending an electronic correspondence from a sender to a recipient is received. The electronic correspondence is provided for delivery to the recipient based on an electronic correspondence address for the recipient included in the electronic correspondence. A sender specified time value associated with the electronic correspondence is received from the sender of the electronic correspondence. The electronic correspondence is deleted from the server on which the electronic correspondence is stored when the received time value has elapsed.

18 Claims, 5 Drawing Sheets

SENDER CONTROL OF EXPIRY OF AN ELECTRONIC MESSAGE

BACKGROUND

The present disclosure generally relates to web-based communications applications and sender control of an expiry of electronic messages.

Electronic copies of correspondences of web-based communications (e.g. email, instant messaging, short message service, etc.) are generally maintained on a server. The electronic copies are made available for search and retrieval until a recipient actively deletes the correspondence. For example, copies of received emails residing in a user's inbox may be maintained on an email server until the recipient deletes the emails. Thus, it may be desirable to implement an application in which a sender is able to manage electronic correspondences maintained on the server.

SUMMARY

The disclosed subject matter relates to a machine-implemented method for deleting an electronic correspondence stored on a server. A command for sending an electronic correspondence from a sender to a recipient is received. The electronic correspondence is provided for delivery to the recipient based on an electronic correspondence address for the recipient included in the electronic correspondence. A sender specified time value associated with the electronic correspondence is received from the sender of the electronic correspondence. The electronic correspondence is deleted from the server on which the electronic correspondence is stored when the received time value has elapsed.

The disclosed subject matter also relates to a machine-readable medium comprising instructions stored therein, which when executed by a system, cause the system to perform operations comprising deleting an electronic correspondence stored on a server. A send command for sending an email from a sender to a recipient is received. The email includes an email address for the recipient. The email further includes a sender-specified time value. The email is stored on a server for a duration based on the sender-specified time value such that when the sender-specified time value has expired, the email is deleted from the server. The email is delivered to the recipient based on the email address by providing the recipient with access to the stored email based on the email address.

According to various aspects of the subject technology, a system comprising one or more processors and a machine-readable medium is provided. The machine-readable medium comprises instructions stored therein, which when executed by a system, cause the system to perform operations comprising deleting an electronic correspondence stored on a server. A command for sending an electronic correspondence from a user to a recipient is received. The electronic correspondence includes an electronic correspondence address for the recipient. The electronic correspondence is delivered to the recipient based on the electronic correspondence address by storing the electronic correspondence on a server and providing the recipient with access to the stored electronic correspondence based on the electronic correspondence address. Information defining a timing of deletion of the electronic correspondence stored on a server is received. The electronic correspondence is deleted from the server when the defined timing has elapsed.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter relates to a machine-implemented method for deleting an electronic correspondence stored on a server. A command for sending an electronic correspondence from a sender to a recipient is received. The electronic correspondence is delivered to the recipient based on the electronic correspondence address by storing the electronic correspondence on a server and providing the recipient with access to the stored electronic correspondence based on the electronic correspondence address. A time value specified by the sender and associated with the electronic correspondence stored on the server is received. The electronic correspondence is deleted from the server when the received time value has elapsed. When the electronic correspondence is deleted, the recipient can no longer access the electronic correspondence from the server.

A sender initiates sending an electronic correspondence from a client device. The sender may also provide an expiration time associated with the electronic correspondence. This expiration time is the time at which the sender wishes to have the electronic correspondence deleted from the server. A copy of the electronic correspondence, such as an email sent from the sender to a recipient, is stored on an email server until the expiration time arrives. The copy of the electronic correspondence is deleted from the server at the sender-specified expiration time value.

Figure 1:
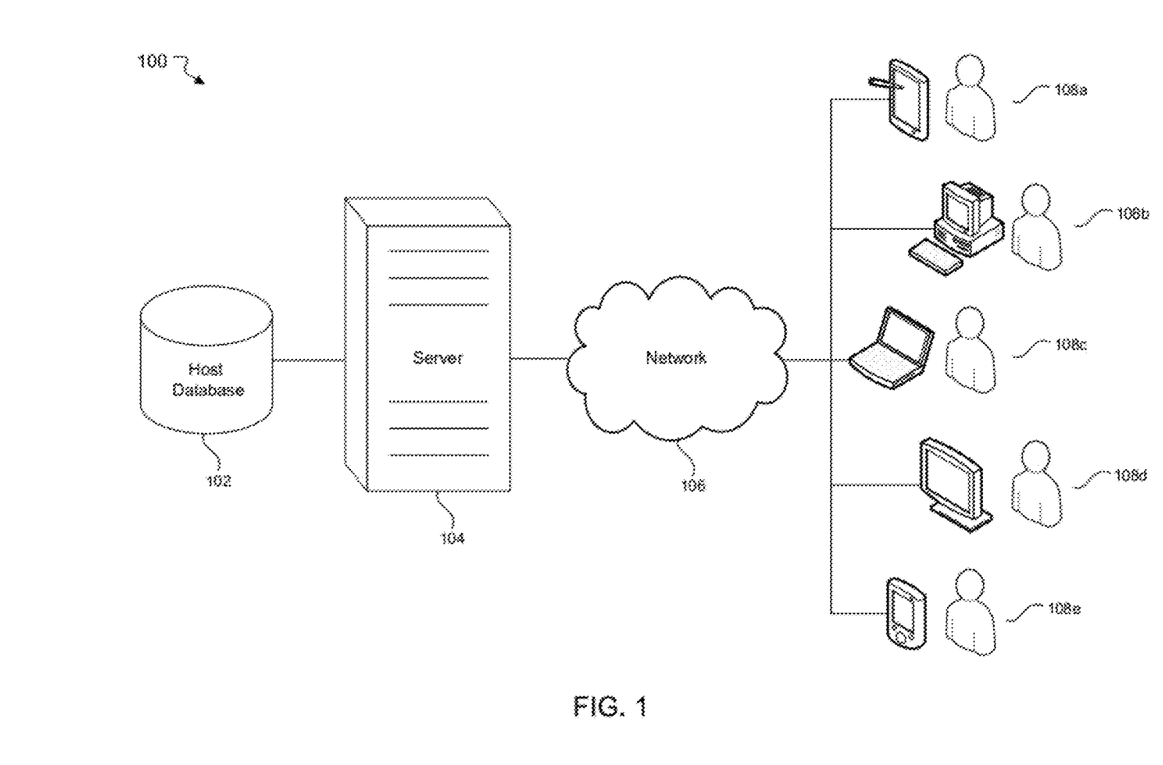
FIG. 1 illustrates an example network environment which provides for administering web-based communications applications.

Network environment 100 comprises one or more databases 102 (e.g., computer-readable storage devices) for storing electronic correspondences for a variety of web-based communications applications. The network environment 100 further comprises one or more servers 104. Server 104 may receive requests from user-operated client devices 108a-108e. Server 104 may also store electronic correspondences received from client devices 108a-108e. Server 104 and client devices 108a-108e may be communicatively coupled through a network 106. In some implementations, client devices 108a-108e may request data from server 104. Upon receiving the request, server 104 may retrieve a set of data from database 102 and serve the set of information to client devices 108a-108e.

Each of client devices 108a-108e can represent various forms of processing devices. Example processing devices can include a desktop computer, a laptop computer, a handheld computer, a television with one or more processors attached or coupled thereto, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices.

In some aspects, client devices 108a-108e may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some aspects, network environment 100 can be a distributed client/server system that spans one or more networks such as network 106. Network 106 can be a large computer network, such as a local area network (LAN), wide area network (WAN), the Internet, a cellular network, or a combination thereof connecting any number of mobile clients, fixed clients, and servers. In some aspects, each client (e.g., client devices 108a-108e) can communicate with servers 104 via a virtual private network (VPN), Secure Shell (SSH) tunnel, or other secure network connection. In some aspects, network 106 may further include a corporate network (e.g., intranet) and one or more wireless access points.

Figure 2:
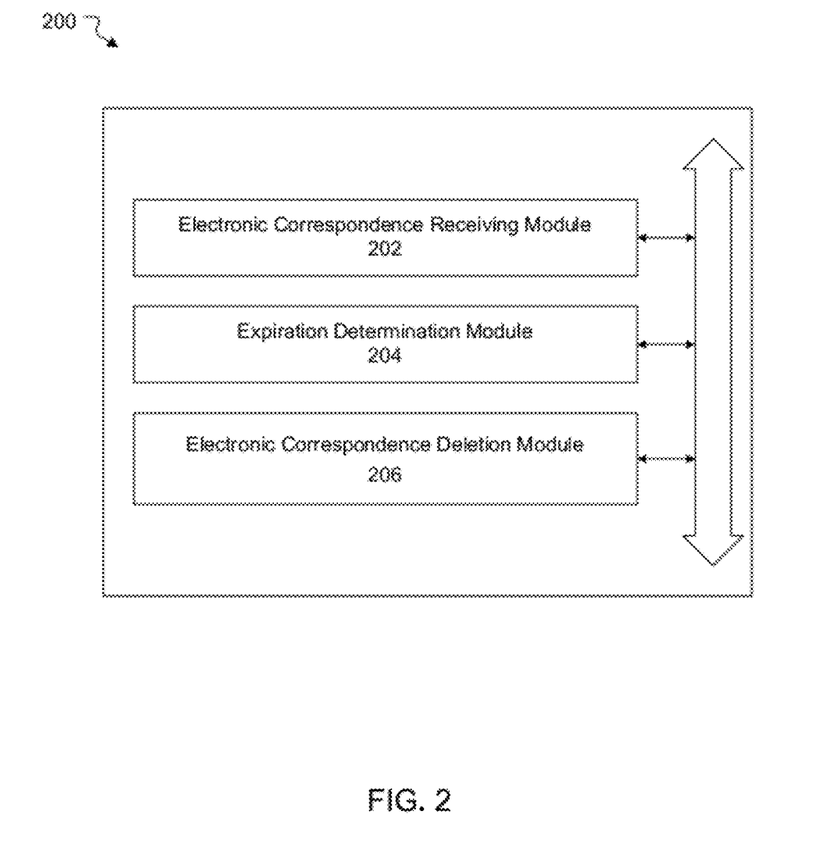
FIG. 2 illustrates an example of a server system for deleting electronic correspondences based on sender specified expiries.

FIG. 2 illustrates an example of a system for deleting an electronic correspondence stored on a server based on a sender specified expiry. System 200 includes electronic correspondence receiving module 202, expiration determination module 204, and electronic correspondence deletion module 206. These modules, which are in communication with one another, process requests from client devices 108a-108e in order to delete electronic correspondences from the server. For example, a request to send an electronic correspondence with an associated expiration may be received by electronic correspondence receiving module 202. Expiration determination module 204 may determine a time to delete the electronic correspondence from the server based on the received expiration associated with the electronic correspondence. When the time to delete the electronic correspondence arrives, electronic correspondence deletion module 204 deletes the electronic correspondence from the database. Once the electronic correspondence is deleted, the electronic correspondence is no longer available to be accessed from the server.

In some aspects, the modules may be implemented in software (e.g., subroutines and code). The software implementation of the modules may operate on web browsers running on client devices 108a-108e. In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
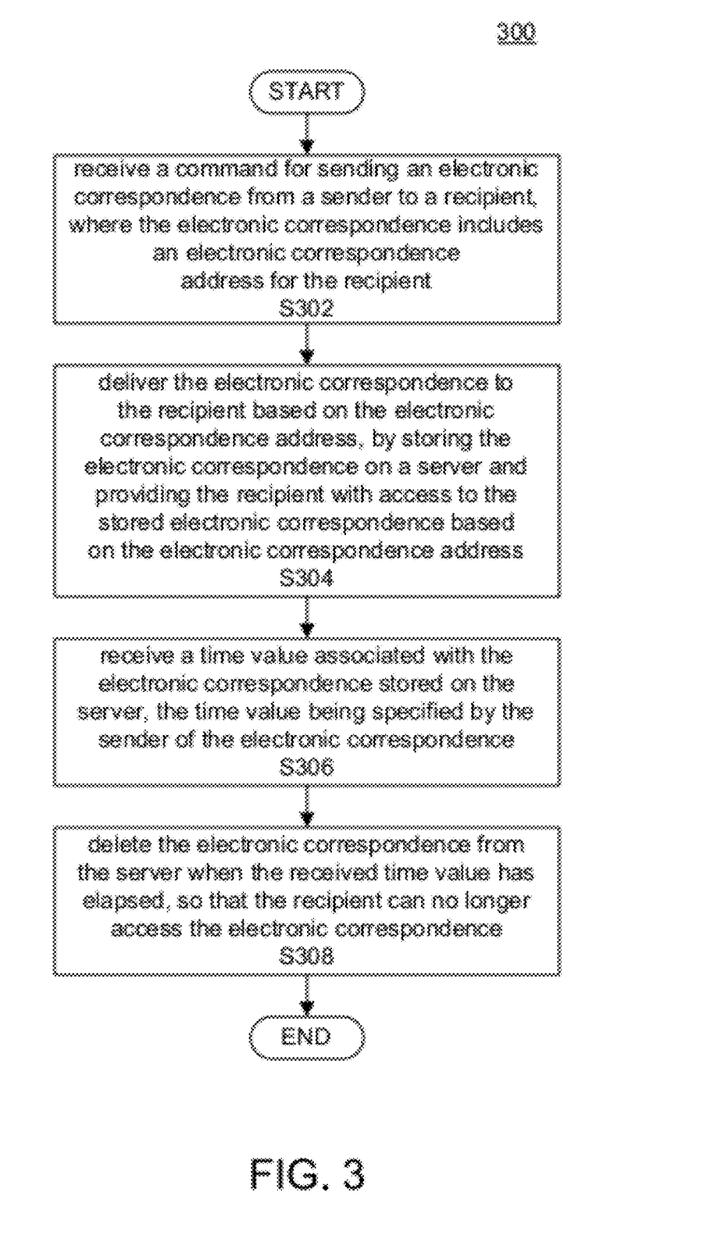
FIG. 3 illustrates an example method for deleting electronic correspondences based on sender specified expiries.

FIG. 3 illustrates example method 300 for deleting an electronic correspondence stored on a server based on a sender specified expiry. A command for sending an electronic correspondence from a sender to a recipient is received, according to S302. The electronic correspondence includes an electronic correspondence address for the recipient. The electronic correspondence may be delivered to the recipient based on the electronic correspondence address, according to S304. In delivering the electronic correspondence, a copy of the electronic correspondence is stored on a server. The recipient to which the electronic correspondence address corresponds is provided access to the electronic correspondence stored on the server.

A time value associated with the electronic correspondence stored on the server is received, according to S306. The time value, which includes a time and a date, may be specified by the sender of the electronic correspondence at the time the electronic correspondence is sent. The time value corresponds to an expiration time of the electronic correspondence. The electronic correspondence is deleted from the server when the received time value has elapsed, according to S308. Once the electronic correspondence is deleted, the electronic correspondence is no longer available to be accessed from the server.

In some implementations, the electronic correspondence may be a web-based email, where a sender sends an email to an email address corresponding to a recipient. Upon being sent, an electronic copy of the sent email may be stored on a server. Access to the electronic copy of the email stored on the server may be provided to an account with an email address corresponding to the recipient. In order to receive the email, the recipient account may access the electronic copy of the email stored on the server.

The sender may further specify a time value corresponding to an expiration of the email in order to limit access to the electronic copy of the email stored on the server. When the specified time value has elapsed, the electronic copy of the email is deleted from the server. Once deleted, the email recipient may no longer have access to the electronic copy of the email stored on the server.

For example, when sending a time sensitive email such as an email invite to a meeting, a sender may specify an expiration time value for the time sensitive email. In this example, the sender may set the expiration time to correspond to the end of the meeting, since the invite will typically no longer be relevant once the meeting has ended. Once the expiration time value has elapsed, the electronic copy of the email is deleted from the server. Thus, if the recipient never opened the email (i.e., retrieved the email from the server), the recipient's email inbox may appear as if the email was never sent/received, thus reducing any unnecessary clutter from the recipient's inbox.

While the example above describes deleting electronic correspondences in web-based email applications, the disclosed subject matter may be applied to other applications that store electronic correspondences on a server for access by recipients. For example, the deletion of electronic correspondences may also be applied to instant messaging, short message service (SMS), group messaging, web-based forums, web-based chat sessions, etc. In each of these examples, an electronic correspondence stored on a server to be accessed by one or more recipients may be deleted by the author of the electronic correspondence. Upon deletion, the one or more recipients may no long have access to the electronic correspondence stored on the server.

In some implementations, the most restrictive rule can be used when a sender specified expiration conflicts with a recipient specified deletion rule. For example, the sender may indicate an expiration two weeks from the day the correspondence was sent, while the recipient may implement a rule to delete all correspondences more than a week old. In this instance, the recipient implement rule to delete all correspondences more than a week old is the more/most restrictive rule, and thus, the recipient rule is utilized to delete the correspondence after one week.

In some implementations, the time value (i.e., the expiration time) associated with the electronic correspondence stored on the server may be a current time. That is, a sender of the electronic correspondence may a request an instantaneous deletion of an electronic correspondence through a web-based electronic correspondence application. For example, a request to delete a previously sent email at the current time may be received from the sender. In this example, the received time value elapses when received, and the electronic correspondence is deleted from the server. Furthermore, application of the most restrictive rule described above causes the deletion at the current time to take precedent over any other expiration time value previously specified by the sender. In some implementations, emails that are deleted from the server may also be retroactively deleted from an inbox of the recipient. If the intended recipient has not read the deleted email, then the inbox of the recipient may appear as if the recipient never received the email.

While the above examples refer to the expiration time as a specific date and time (e.g., time and date on a calendar), the expiration time may alternatively be defined as a duration in some implementations. That is, instead of setting the expiration as a date and time at which the user would like the records of the electronic correspondence to be deleted, the user may indicate a duration from the time a web-based discussion is created. In some implementations, the expiration time may also be modifiable after an initial expiration time is set at the time the electronic correspondence is sent.

Figure 4:
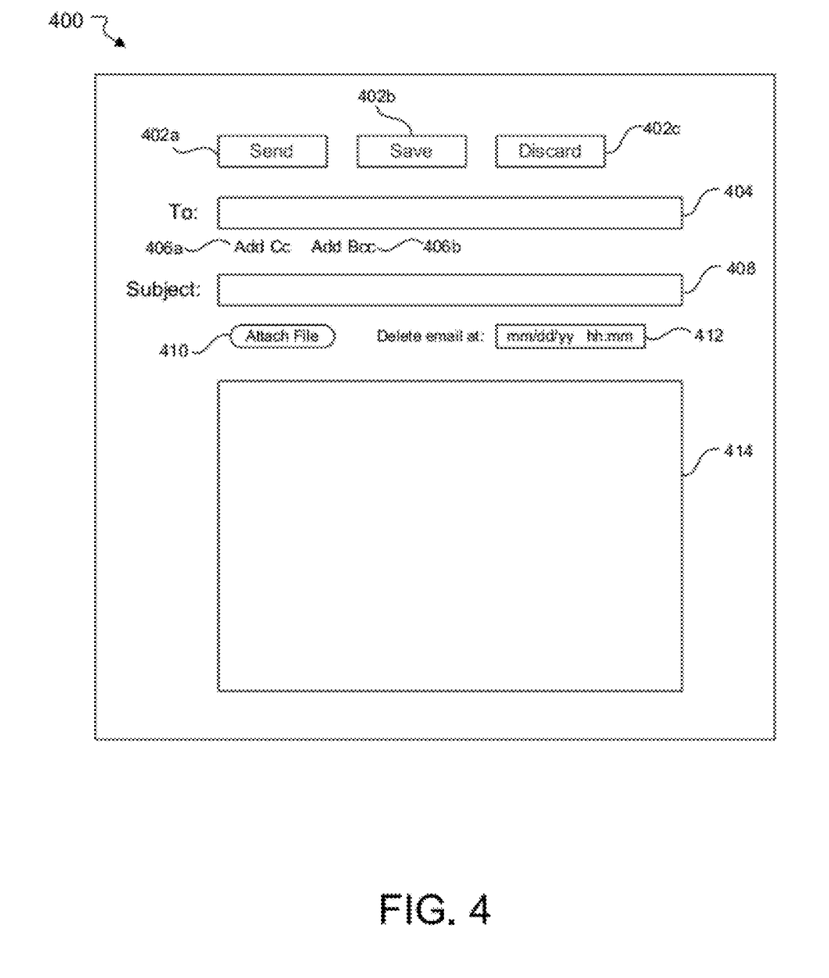
FIG. 4 illustrates an example user interface of a web-based email application from which an expiration time may be specified by the sender of an email.

FIG. 4 provides an example illustration of user interface 400 for a web-based email application from which a user-specified expiration may be applied. The user interface may include command buttons/icons 402a-402c. Each command button/icon performs a different function in the web-based email application. Send button/icon 402a initiates a transmittal of an email correspondence from the sender to a recipient. Upon activation of send button/icon 402a, the text in the subject box 408 as well as the body 414 of the email correspondence is sent to a server for subsequent retrieval by one or more recipients. Save button/icon 402b saves a draft of the email correspondence. That is, any recipient email addresses and any text corresponding to the subject box 408 and to the body 414 of the email correspondence entered by the sender is saved for later retrieval by the sender. Activation of discard button/icon 402c by the sender will discard the current draft email correspondence.

User interface 400 also provides a "To:" box 404 for the sender to specify email addresses of recipients. Additionally, activation of either "Add Cc" button/icon 406a or "Add Bcc" button/icon 406b will provide additional boxes into which the sender may add additional email addresses in order to "carbon copy" and "blind carbon copy" the email correspondence. Furthermore, attach button/icon 410, when activated, may allow the user to attach a file to the email correspondence.

Expiration time field 412 may also be provided to allow the user to select a date and time for which the user would like the email correspondence to be deleted. Expiration time field 412 may provide a calendar and clock when activated, and the sender may select from a variety of values provided by the calendar and clock. In some implementations, expiration time field 412 may provide a field for the sender to specify an expiry of the email correspondence by entering a date and time into expiration time field 412 via an input device (e.g., a keyboard). Any email correspondences sent with a specified date and time will have an associated expiration time, and the email correspondences are deleted from the server when the specified date and time arrives.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
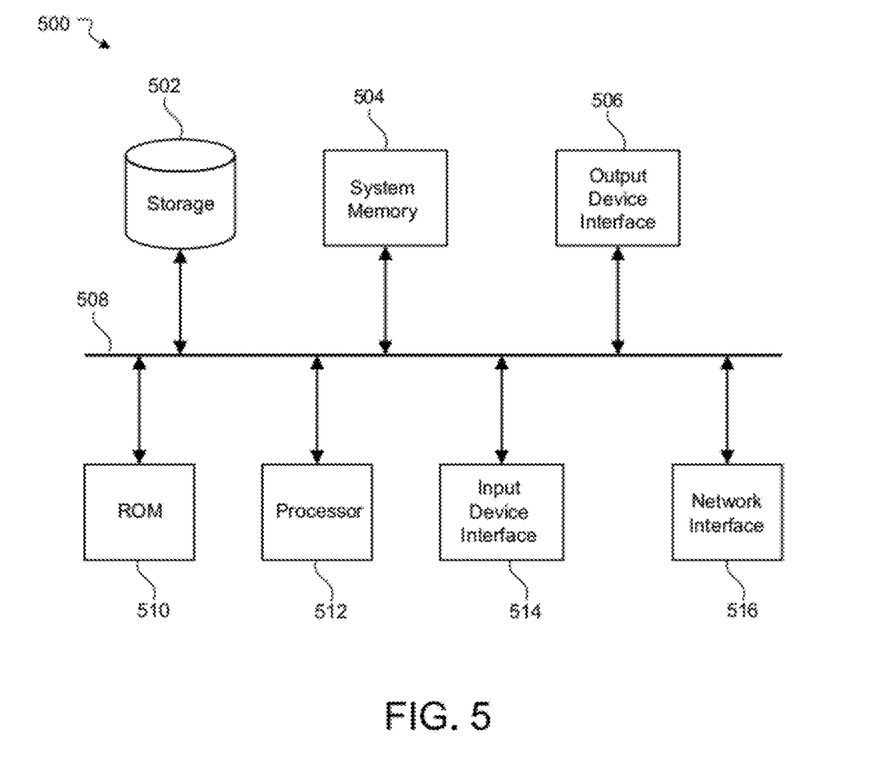
FIG. 5 conceptually illustrates an example electronic system with which some implementations of the subject technology are implemented.

FIG. 5 conceptually illustrates an example electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such as random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for deleting electronic correspondences stored on a server in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interface 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD–RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of deleting an electronic correspondence stored on a server, the method comprising:
   receiving a command for sending an electronic correspondence from a sender to a recipient, the electronic correspondence comprising an electronic correspondence address for the recipient;
   storing the electronic correspondence on a server;
   providing the recipient access to the stored electronic correspondence based on the electronic correspondence address;
   receiving a sender-specified time value associated with the electronic correspondence stored on the server;
   receiving a recipient-specified time value associated with the electronic correspondence stored on the server;
   identifying a more restrictive of the sender-specified time value and the recipient-specified time value; and
   providing for deletion of the electronic correspondence from the server when the more restrictive of the sender-specified time value and the recipient-specified time value has elapsed.

2. The method of claim 1, wherein the sender-specified time value and the recipient-specified time value are specified as a date and a time, and wherein providing for deletion of the electronic correspondence from the server comprises providing for deletion of the electronic correspondence from the server at the more restrictive specified date and time.

3. The method of claim 1, wherein the sender-specified time value and the recipient-specified time value is are specified as a duration including at least one of seconds, minutes, hours, or days, and wherein providing for deletion of the electronic correspondence from the server comprises providing for deletion of the electronic correspondence from the server when the more restrictive specified duration has elapsed.

4. The method of claim 1, wherein the more restrictive of the sender-specified time value and the recipient-specified time value is the earlier of the sender-specified time value and the recipient-specified time value.

5. The method of claim 1, wherein the electronic correspondence comprises textual communication.

6. The method of claim 5, wherein the textual communication comprises one of web-based email, instant messaging, short message service, web-based group messaging, and web-based chat session.

7. The method of claim 1, wherein when the electronic correspondence is deleted from the server before the recipient has accessed the electronic correspondence from the server for a first time, the electronic correspondence does not populate an email inbox of the recipient.

8. The method of claim 1, wherein the identifying comprises:
  detecting a conflict between the sender-specified time value and the recipient-specified time value; and
  identifying, in response to the detection, the more restrictive of the sender-specified time value and the recipient-specified time value.

9. A computer-machine readable medium comprising instructions stored therein, which when executed by a machine, cause the machine to perform operations comprising:
  receiving a send command for sending an email from a sender to a recipient, wherein the email comprises an email address for the recipient, and wherein the email further comprises a sender-specified time value;
  storing the email on a server;
  delivering the email to the recipient based on the email address by providing the recipient with access to the stored email based on the email address;
  receiving a recipient-specified time value associated with the email;
  identifying a more restrictive of the sender-specified time value and the recipient-specified time value; and
  providing for deletion of the email from the server when the more restrictive of the sender-specified time value and the recipient-specified time value has expired.

10. The computer-readable medium of claim 9, wherein the sender-specified time value and the recipient-specified are specified as a date and a time, and wherein providing for deletion of the email from the server comprises providing for deletion of the email from the server at the more restrictive specified date and time.

11. The computer-readable medium of claim 9, wherein the sender-specified time value and the recipient-specified are specified as a duration including at least one of seconds, minutes, hours, or days, and wherein providing for deletion of the email from the server comprises providing for deletion of the email from the server when the more restrictive specified duration has elapsed.

12. The computer readable medium of claim 9, wherein the more restrictive of the sender-specified time value and the recipient-specified time value is the earlier of the sender-specified time value and the recipient-specified time value.

13. The computer-readable medium of claim 9, wherein the sender-specified time value is modifiable by the sender.

14. The computer-readable medium of claim 9, wherein when the email is deleted from the server before the recipient has accessed the email from the server for a first time, the email does not populate an email inbox of the recipient.

15. The computer-readable medium of claim 9, wherein when the email is deleted from the server after the recipient has accessed the email from the server, the email is retroactively removed from an email inbox of the recipient.

16. A system for hosting web-based electronic correspondences, the system comprising:
  one or more processors; and
  a computer-readable medium comprising instructions stored therein, which when executed by the processors, cause the processors to perform operations comprising:
    receiving a command for sending an electronic correspondence from a user to a recipient, the electronic correspondence comprising an electronic correspondence address for the recipient; storing the electronic correspondence on a server;
    providing the recipient access to the stored electronic correspondence based on the electronic correspondence address;
    receiving information defining a sender-specified timing of deletion of the electronic correspondence stored on the server;
    receiving information defining a recipient-specified timing of deletion of the electronic correspondence stored on the server;
    identifying a more restrictive of the sender-specified timing and the recipient-specified timing; and
    providing for deletion of the electronic correspondence from the server when the more restrictive of the sender-specified timing and the recipient-specified timing has elapsed.

17. The system of claim 16, wherein the electronic correspondence is an email, and wherein when the email is deleted from the server before the recipient has accessed the email from the server for a first time, the email does not populate an email inbox of the recipient.

18. The system of claim 16, wherein the electronic correspondence is an email, and wherein when the email is deleted from the server after the recipient has accessed the email from the server, the email is retroactively removed from an email inbox of the recipient.

\* \* \* \* \*

UNITED STATES PATENT AND TRADEMARK OFFICE
CERTIFICATE OF CORRECTION

| | |
|---|---|
| PATENT NO. | : 8,291,031 B1 |
| APPLICATION NO. | : 13/306925 |
| DATED | : October 16, 2012 |
| INVENTOR(S) | : Stephen Kirkham et al. |

It is certified that error appears in the above-identified patent and that said Letters Patent is hereby corrected as shown below:

IN THE CLAIMS:

In Column 11, Line 20

Replace "A computer-machine readable medium comprising"

with --A computer-readable medium comprising--.

Signed and Sealed this
Twenty-fifth Day of June, 2013

Teresa Stanek Rea
*Acting Director of the United States Patent and Trademark Office*